Sept. 8, 1925
W. C. SMITH
SUCKER ROD GUIDE
Filed Jan. 2, 1925
1,552,883
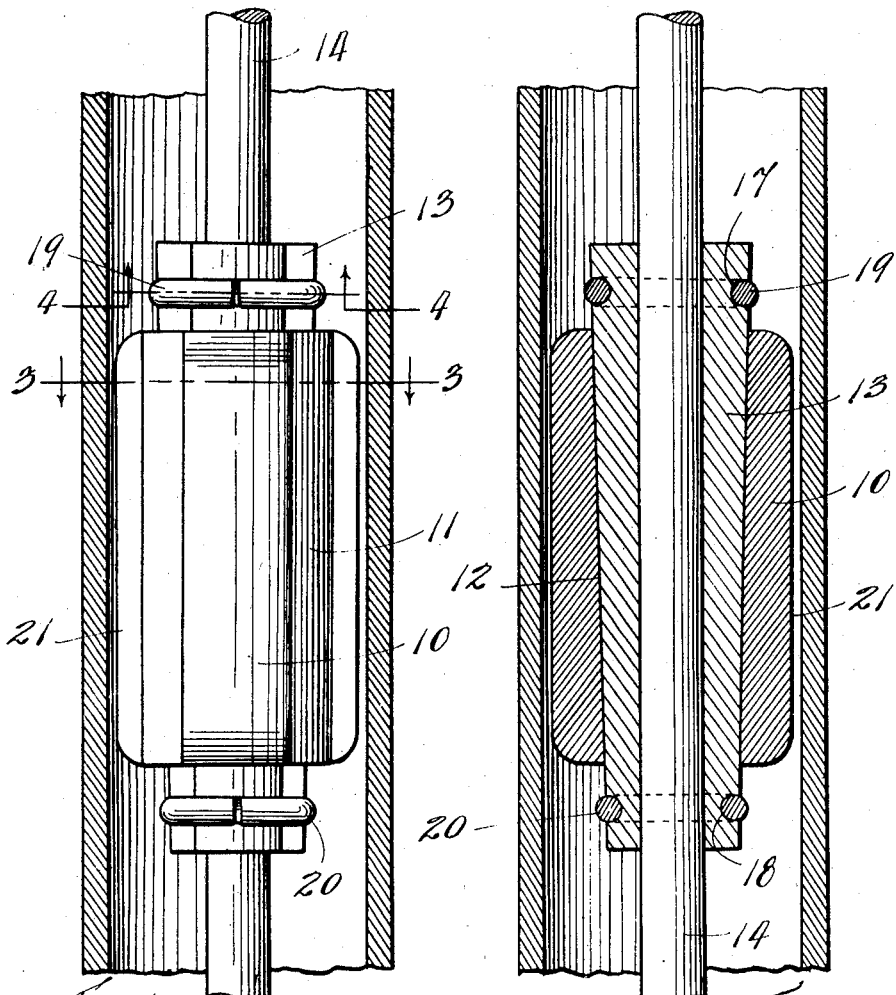
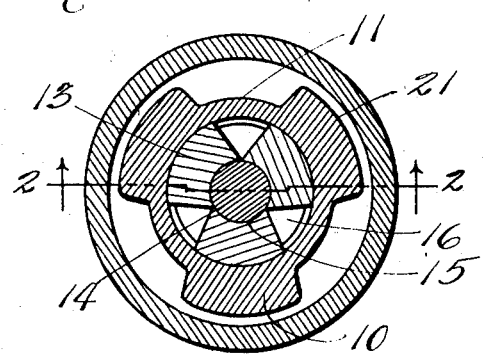
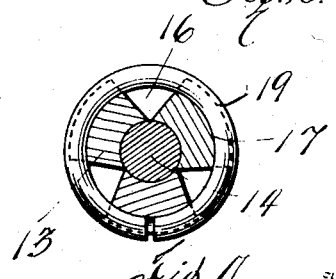
Inventor
W. C. Smith
By Jack Ashley
Attorney Patented Sept. 8, 1925.

1,552,888

UNITED STATES PATENT OFFICE.

WILLIAM C. SMITH, OF NAVARRO, TEXAS.

SUCKER-ROD GUIDE.

Application filed January 2, 1925. Serial No. 103.

*To all whom it may concern:*

Be it known that I, WILLIAM C. SMITH, a subject of the King of England, residing at Navarro, in the county of Navarro and State of Texas, have invented certain new and useful Improvements in Sucker-Rod Guides, of which the following is a specification.

This invention relates to new and useful improvements in sucker rod guides.

The object of the invention is to provide a guide which may be readily replaced when worn and from which a maximum number of parts may be salvaged and again used.

A particular object of the invention is to provide a guide comprising a bushing adapted to take the wear and is replaceable by a new bushing, when worn, together with means for fastening the bushing on the rod and which may be used indefinitely.

Another object is to provide a plurality of wedges for fastening the bushing in place; together with means for holding the wedges in position on the sucher rod.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is an elevation of a sucker rod equipped with a guide constructed in accordance with my invention, the tubing being shown in section, Fig. 2 is a vertical sectional view taken on the line 2—2 of Fig. 3, Fig. 3 is a horizontal cross-sectional view taken on the line 3—3 of Fig. 1, and Fig. 4 is a cross-sectional view taken on the line 4—4 of Fig. 1.

In the drawings the numeral 10 designates an elongated cylindrical bushing which is preferably but not necessarily made of bronze or other non-corrosive metal. The bushing has a diameter considerably in excess of the coupling of the sucker rod on which it is used. Equally spaced channels 11 are provided longitudinally in the outer surface of the bushing to afford suitable passage for the upward flow of the liquid.

The bushing has a downwardly tapered axial bore 12, circular in cross-section. Sector-shaped wedges 13 of greater length than the bushing are driven into the bore of the bushing around the rod 14. I have shown three of these wedges with their surfaces 15 shaped to fit the rod, each occupying one-third of its surface. The sides of the wedges are cut off so as to leave vertical passages 16 therebetween for the upward flow of the liquid.

The wedges are formed so that upon being driven tightly into the bore 12 and wedged around the rod their upper and lower ends will project the ends of the bushing. In the outer surfaces of the upper ends of the webs are circumferential grooves 17, while similar grooves 18 are cut in the lower ends of said wedges. A split metallic retaining ring 19 is slipped over the upper ends of the wedges and seated in the grooves 17, while a similar ring 20, smaller in diameter, is seated in the grooves 18. These rings hold the wedges in place.

The upper and lower ends of the ribs 21, which are formed between channels 11, are rounded so as to more readily pass the tubing joints and so as not to catch on projections. So long as the diameter of the bushing is greater than that of the rod couplings, the latter will be protected from wear. When the bushing wears to this point, the rings 19 and 20 are slipped and the wedges 13 are removed. The worn bushing is replaced by a new bushing and the same wedges and rings are again used. This makes for economy and provides a practical and effective sucker rod guide.

Various changes in the size and shape of the different parts, as well as modifications and alterations may be made within the scope of the appended claims.

What I claim is:

1. In a sucker rod guide, a cylindrical external bushing having a smooth tapered axial bore, and a plurality of wedges having smooth inner and outer faces and driven into the bushing to frictionally engage the smooth bore thereof, and the surface of the rod which the bushing surrounds.

2. In a sucker rod guide, a cylindrical bushing, a plurality of fastening wedges engaging in the bore of the bushing, and a retaining ring engaging the wedges exteriorly of the bushing for holding them in position on a sucker rod.

3. In a sucker rod guide, a cylindrical bushing, and a plurality of wedges having their inner longitudinal faces curved to fit in continuity around a sucker rod, said wedges engaging in the bore of the bushing and spaced apart therein to provide liquid passages therebetween.

4. In a sucker rod guide, a cylindrical bushing, a plurality of wedges having their inner longitudinal faces curved to fit in continuity around a sucker rod, said wedges engaging in the bore of the bushing and spaced apart therein to provide liquid passages therebetween, and retaining rings engaged on the upper and lower ends of the wedges.

5. In a sucker rod guide, an elongated cylindrical bushing having longitudinal channels in its outer surface with ribs therebetween, the ends of the ribs being rounded, said bushing having a tapered axial bore, a plurality of wedges engaging in the bore for fastening the bushing on a sucker rod, the upper and lower ends of the wedges projecting beyond the ends of the bushing and retaining elements engaged around said projecting ends.

In testimony whereof I affix my signature

WILLIAM C. SMITH